United States Patent
Grillenberger et al.

(10) Patent No.: US 12,018,608 B2
(45) Date of Patent: Jun. 25, 2024

(54) CYLINDER HEAD

(71) Applicant: AVL LIST GMBH, Graz (AT)

(72) Inventors: Dieter Grillenberger, Fernitz (AT); Michaela Pausch, Graz (AT); Jürgen Kelz, Pischelsdorf (AT); Jens Timm, Graz (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 18/020,481

(22) PCT Filed: Aug. 10, 2021

(86) PCT No.: PCT/AT2021/060278
§ 371 (c)(1),
(2) Date: Feb. 9, 2023

(87) PCT Pub. No.: WO2022/032318
PCT Pub. Date: Feb. 17, 2022

(65) Prior Publication Data
US 2023/0374933 A1    Nov. 23, 2023

(30) Foreign Application Priority Data
Aug. 10, 2020   (AT) .............................. A 50673/2020

(51) Int. Cl.
*F02B 19/10*    (2006.01)
*F02B 19/12*    (2006.01)
(Continued)

(52) U.S. Cl.
CPC .......... *F02B 19/1009* (2013.01); *F02B 19/16* (2013.01); *F02F 1/36* (2013.01); *B33Y 80/00* (2014.12); *F02B 19/12* (2013.01)

(58) Field of Classification Search
CPC ...... F02B 19/1009; F02B 19/16; F02B 19/12; F02F 1/36; B33Y 80/00
(Continued)

(56) References Cited

U.S. PATENT DOCUMENTS

2011/0005478 A1   1/2011   Taliaferro
2015/0020766 A1   1/2015   LaPointe et al.
(Continued)

FOREIGN PATENT DOCUMENTS

CN    205225432 U    5/2016
DE    1751542 A1    3/1971
(Continued)

OTHER PUBLICATIONS

DE-102016012319-A1 (Sebastian et al.) (Apr. 19, 2018) (Machine Translation) (Year: 2018).*

*Primary Examiner* — Mahmoud Gimie
(74) *Attorney, Agent, or Firm* — Dykema Gossett PLLC

(57) ABSTRACT

The invention relates to a cylinder head (1) for an internal combustion engine, with a prechamber (2) which is arranged in the cylinder head (1) and is defined by an inner wall surface (11) of a prechamber wall (5), wherein the prechamber (5) comprises a first chamber portion (3) and a second chamber portion (4), wherein the first chamber portion (3) has a greater maximum diameter (D) than the second chamber portion (4), wherein at least one ignition device (16) opens into the first chamber portion (3), and the second chamber portion (3) comprises at least one overflow channel (7) for the passage of flow into a combustion chamber (8) which adjoins a fire deck (6). Am improved dissipation of heat can be achieved if at least one inner wall surface (11) of the first chamber portion (3) comprises at least one first flattened portion (13).

19 Claims, 2 Drawing Sheets

(51) Int. Cl.
  *F02B 19/16*    (2006.01)
  *F02F 1/36*     (2006.01)
  *B33Y 80/00*    (2015.01)
(58) Field of Classification Search
  USPC ......................................................... 123/254
  See application file for complete search history.

(56)         References Cited

U.S. PATENT DOCUMENTS

2017/0167357 A1*  6/2017  Maier ...................... F02F 1/40
2019/0078498 A1*  3/2019  Bedogni ............. F02B 19/1019
2019/0271262 A1*  9/2019  Leroux .................... F02F 1/24

FOREIGN PATENT DOCUMENTS

DE           2308358 A1     9/1974
DE       102016012319 A1 *  4/2018   .......... F02B 19/1023
DE       102016012319 A1    4/2018
EP           3118433 A1 *   1/2017   .......... F02B 19/1014
EP           3118433 A1     1/2017
GB           2544465 A  *   5/2017   .............. F02B 19/10
JP         2018-172971 A   11/2018

\* cited by examiner

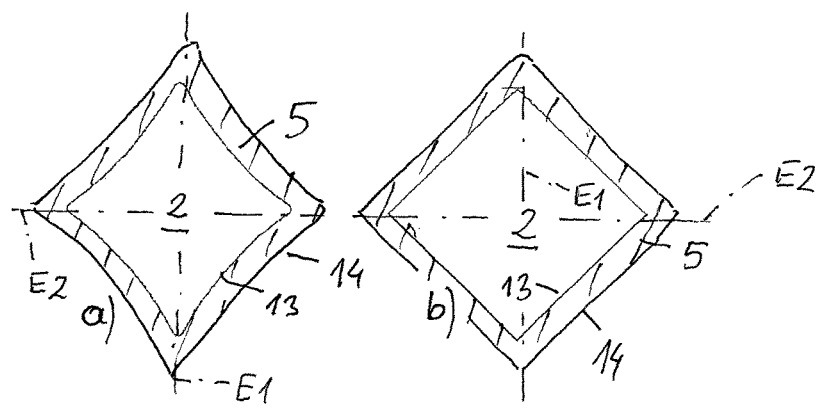
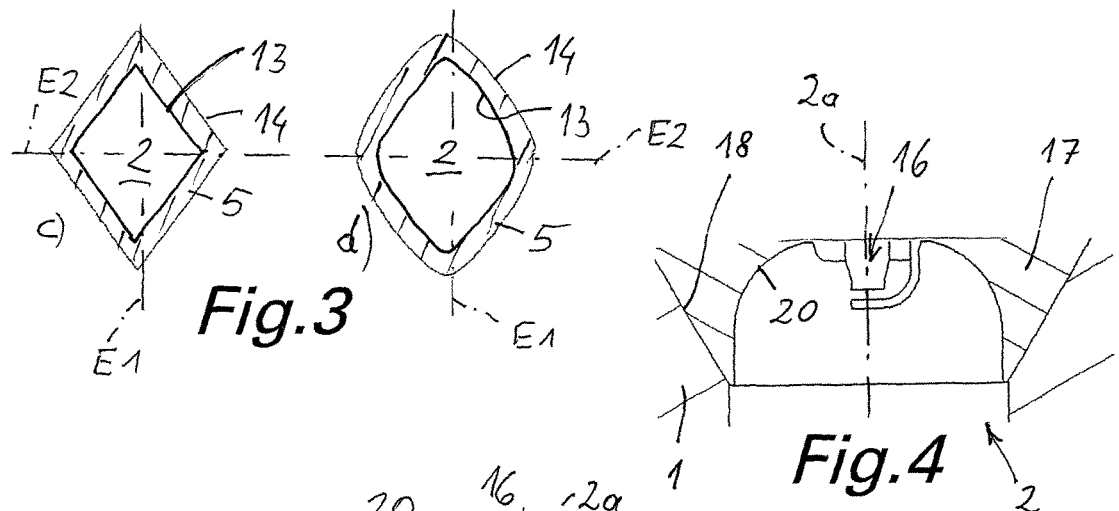
Fig.3
Fig.4
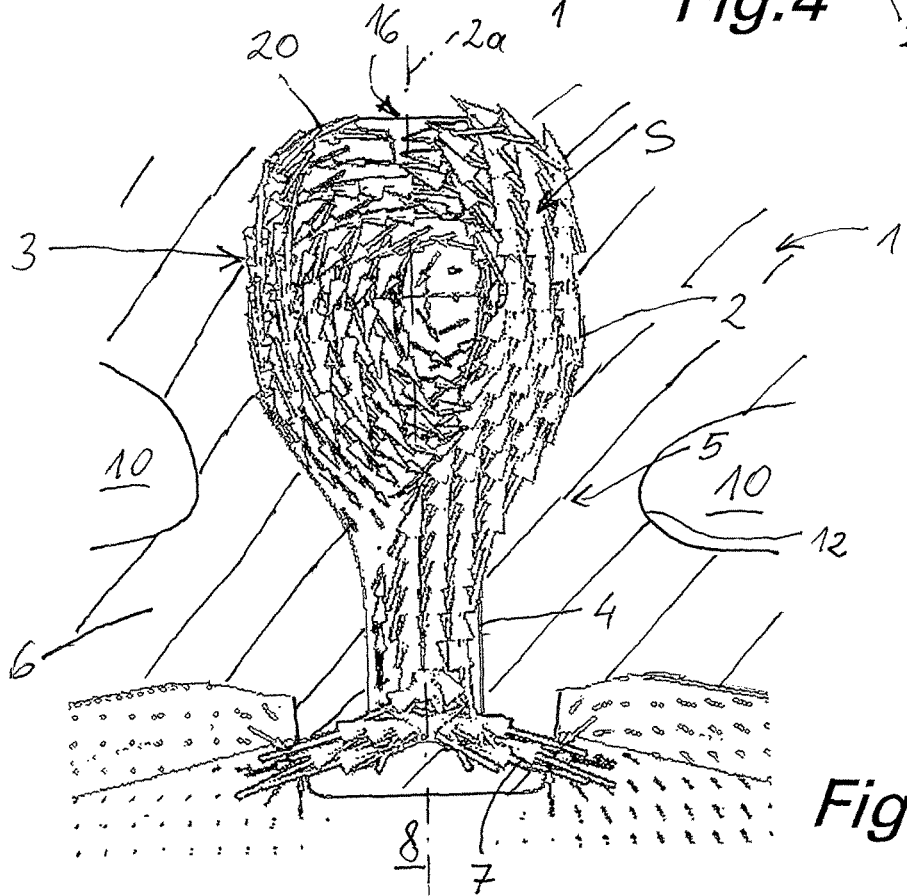
Fig.5

CYLINDER HEAD

CROSS-REFERENCE TO RELATED APPLICATIONS

This application is a national stage filing based upon International application No. PCT/AT2021/060278, filed 10 Aug. 2021, which claims the benefit of priority to Austria application No. A 50673/2020, filed 10 Aug. 2020.

FIELD OF THE INVENTION

The invention relates to a cylinder head for an internal combustion engine, having a prechamber which is arranged in the cylinder head and is defined by an inner wall surface of a prechamber wall, wherein the prechamber comprises a first chamber portion and a second chamber portion, wherein the first chamber portion has a greater diameter than the second chamber portion, wherein at least one ignition device opens into the first chamber portion, and the second chamber portion comprises at least one overflow channel for the passage of flow into a combustion chamber which adjoins a fire deck.

SUMMARY OF THE INVENTION

A common design for a prechamber for a spark-ignition internal combustion engine is by means of a prechamber sleeve screwed into a bore in the cylinder head. The ignition device is screwed into the prechamber sleeve, which closes off the prechamber at the top. The prechamber sleeve and ignition device form the prechamber, which is inserted or screwed into the cylinder head to position and hold the prechamber in the combustion chamber.

JP 2018-172971 A discloses a partially integrated prechamber, wherein a chamber portion adjacent to the combustion chamber is formed by a separate part screwed into the cylinder head from the side of the combustion chamber. Overflow channels are formed in the separate part.

It is also known to form prechambers without a prechamber sleeve and to integrate them directly into the cylinder head. Such prechambers are known, for example, from DE 1 751 542 A1, US 2015/00220766 A1 or DE 2 308 358 A.

Known embodiments have the disadvantage that, particularly in cylinder heads with four gas exchange valves and a centrally arranged prechamber, there are structural constraints and adequate cooling of the prechamber cannot always be ensured, especially if prechamber sleeves are used. However, even in known cylinder heads with prechambers integrated into the cylinder head, large wall thicknesses of the prechamber wall and accumulations of material between the prechamber and the cooling jacket can adversely affect heat dissipation.

SUMMARY OF THE INVENTION

It is the object of the invention to achieve improved heat dissipation in a cylinder head of the type described above.

According to the invention, this is achieved in that at least one inner wall surface of the first chamber portion comprises at least one first flattened portion.

A flattened portion is defined as an area of the wall surface that has a smaller curvature and/or a larger radius of curvature than adjacent wall surface areas.

Preferably, it is provided that at least one first flattened portion is arranged in a transition region to the second chamber portion.

According to one embodiment variant of the invention, the prechamber is surrounded—at least in the region of the first flattened portion—by a cooling jacket, wherein the prechamber wall separates the cooling jacket from the prechamber, and wherein at least one outer wall surface of the prechamber wall has a second flattened portion on the cooling jacket side in the region of at least one first flattened portion.

A particularly compact design can be achieved if a plurality—preferably at least three or at least four, in particular exactly four—of first and/or second flattened portions are arranged—in particular uniformly—around the circumference of the first chamber portion.

One embodiment of the invention provides that the first chamber portion has a substantially rhombus-shaped cross-section in the region of the first flattened portions. In a section normal to the prechamber vertical axis, the first chamber portion thus has essentially the shape of a rhombus. A rhombus is defined as a planar quadrilateral having four sides of equal length. The prechamber vertical axis extends parallel to the cylinder vertical axis, for example, and may coincide with the latter. In particular, the prechamber vertical axis may form an axis of symmetry of the prechamber. Thus, the first flattened portions and/or the second flattened portions—as viewed in cross-section to the cylinder axis and/or the prechamber vertical axis—can be arranged essentially in the form of a rhombus.

Preferably, it is provided that the first and/or second flattened portions form substantially the shape of a square cone.

The first flattened portions and the second flattened portions may be of flat design, i.e. without curvatures. In other embodiment variants of the invention, it is provided that the first and/or second flattened portions have a concave or convex curvature, relative to the adjacent cavity.

Preferably, at least one first and/or second flattened portion is arranged in a region between a cylinder axis—or a prechamber vertical axis—and at least one gas exchange channel. As seen in plan view, at least one surface normal of at least one first and/or second flattened portion can be guided through a valve center of a nearest gas exchange valve.

At least one first flattened portion and/or second flattened portion is preferably arranged in a region of the inner wall surface and/or outer wall surface which has the smallest distance to an adjacent gas exchange channel. The lower regions of the inner wall surfaces and/or the outer wall surfaces of the prechamber, which have the smallest wall distance from the gas exchange channels or the corresponding seat rings, thus have a flattened shape.

As a result, the distance between the prechamber and the cooling jacket can be reduced and more cross-sectional area is available for the flow of coolant in the cooling jacket. Since no constriction is required at the gas exchange channels, larger flow cross-sections are also available for the charge exchange, and larger seat rings can also be used. This makes it possible to maximize heat transfer into the coolant. In this way, the ignition device and prechamber in particular can be cooled as required.

The first flattened portions and/or second flattened portions are preferably formed symmetrically to at least one vertical plane containing the prechamber vertical axis. It is particularly advantageous if the first flattened portions and/or second flattened portions are formed symmetrically with respect to a first vertical plane containing the prechamber vertical axis and with respect to a second vertical plane containing the prechamber axis and positioned normal to the first vertical plane, wherein the vertical planes extend between the gas exchange valves of the internal combustion engine.

The first flattened portions form flow guide surfaces for fuel/air mixture flowing from the combustion chamber into the prechamber in the direction of the ignition device. The symmetrical arrangement of the first flattened portions in relation to the first and second vertical planes enables a substantially swirl-free inflow into the prechamber. Rotational movements of the flow about the prechamber vertical axis are thus avoided. Thus, flow guidance for charge movement in the prechamber is not adversely affected.

Components can be saved if the prechamber is at least partially integrated in the cylinder head, with preferably the prechamber being fully integrated in the cylinder head. No other components are therefore located between the prechamber and the cylinder head, cooling water jacket and/or charge exchange channels. This results in great design freedom.

Simple manufacturing is possible if the cylinder head and/or the prechamber is produced using an additive manufacturing process. An additive manufacturing process—which is also known as 3D printing—is a manufacturing process in which material is applied layer by layer under computer control according to specified dimensions and shapes.

At least one overflow channel may be produced by a drilling operation.

One embodiment variant of the invention provides that a conical or crowned sealing seat is formed between the ignition device and the prechamber wall. A part accommodating the ignition device and separated from the lateral prechamber wall can form the prechamber roof. The remaining part of the prechamber is advantageously formed by the cylinder head.

The design according to the invention allows great design freedom in the prechamber geometry.

BRIEF DESCRIPTION OF THE DRAWING

The invention is explained in more detail below with reference to the non-limiting exemplary embodiments shown in the figures, which schematically show as follows:

FIG. 3a to FIG. 3d prechambers of cylinder heads according to the invention in various embodiment variants, in sections according to line II-II in FIG. 1;

FIG. 4 a detail of the prechamber in an embodiment variant according to the invention in a section analogous to FIG. 1; and FIG. 5 a flow profile of the flow in the prechamber during a compression stroke of the internal combustion engine.

DETAILED DESCRIPTION

Figure 1:
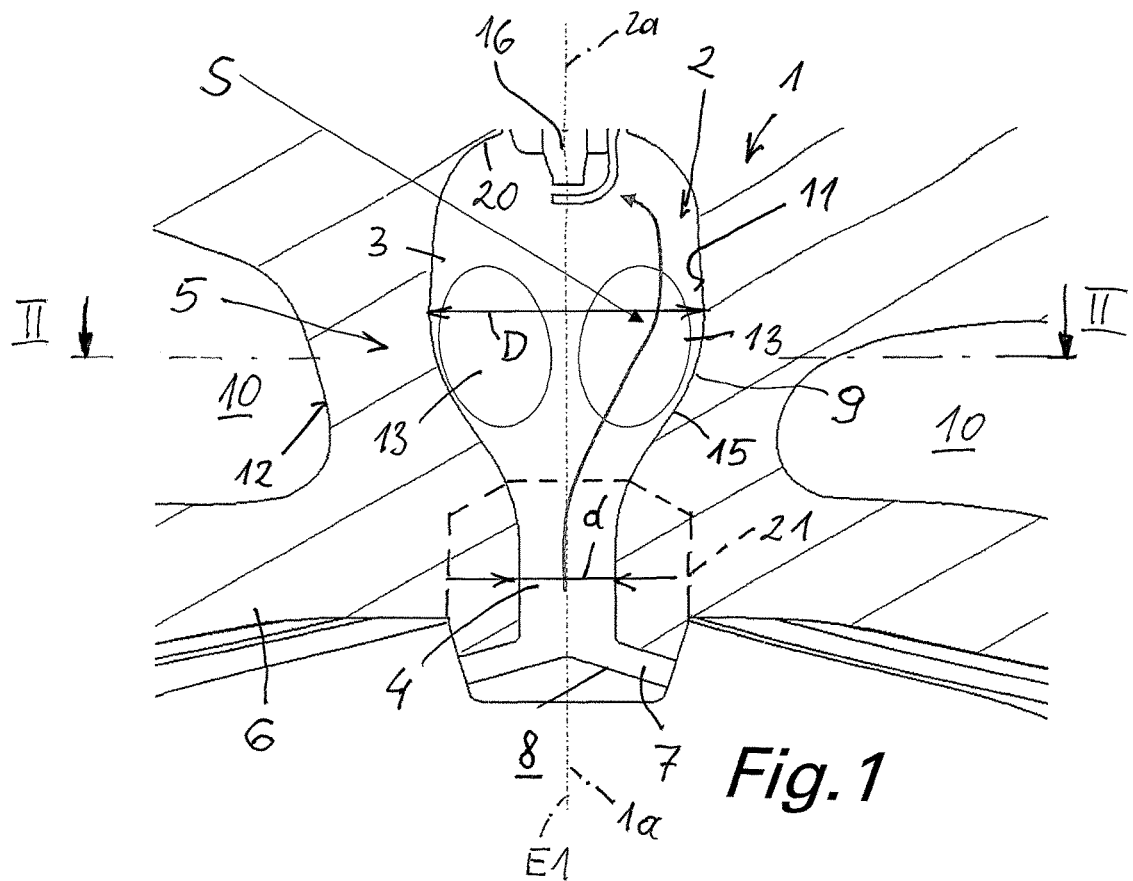
FIG. 1 a cylinder head according to the invention in a section according to line I-I in FIG. 2.

FIG. 1 shows a cylinder head 1 of an internal combustion engine with at least one cylinder, having a fully integrated prechamber 2. The prechamber 2 has a substantially bottle- or pear-shaped configuration with a barrel-like first chamber portion 3 and a substantially cylindrical second chamber portion 4. The prechamber 2 is formed by a prechamber wall 5 formed by the cylinder head 1. The upper first chamber portion 3 has a larger maximum diameter D than the lower second chamber portion 4 arranged in the region of the fire deck 6 of the cylinder head 1, the maximum diameter of which is denoted by d. The second chamber portion 4 is connected to the combustion chamber 8 of a cylinder of the internal combustion engine, which is not shown in closer detail, via overflow channels 7. An ignition device 16 opens into the prechamber 2 in the region of a prechamber cover surface 20 of the prechamber 2 which closes off the prechamber at the top. Reference sign 2a designates the vertical axis of the prechamber, which in the exemplary embodiments coincides with the cylinder axis 1a of the corresponding cylinder of the internal combustion engine.

According to an embodiment variant of the invention with partially integrated prechamber 2 indicated by dashed lines in FIG. 1, the second chamber portion 4 can also be formed by a separate part 21 which is screwed into the cylinder head 1 from the side of the combustion chamber 8. The overflow channels 7 are then arranged in this separate part 21.

Reference sign S in FIG. 1 indicates the flow of the fuel/air mixture in the prechamber 2 during a compression stroke. A detailed flow profile is also shown in FIG. 5.

In the exemplary embodiment shown in FIG. 1, the prechamber 2 is surrounded by a cooling jacket 10 in a central region 9. The prechamber wall 5 separates the cooling jacket 10 from the prechamber 2.

The prechamber wall 5 forms a lateral inner wall surface 11 facing the interior of the prechamber 2 and an outer wall surface 12 facing the cooling jacket 10.

The inner wall surface 11 has first flattened portions 13 distributed around the circumference. Corresponding to the first flattened portions 13, the outer wall surface 12 also has corresponding second flattened portions 14. The second flattened portions 14 are thus arranged on the coolant-side prechamber wall 5 in each case in the region of the first flattened portions 13.

In this case, the first flattened portions 13 are located in the central region 9 of the prechamber 2 or in a central and/or lower region of the first chamber portion 3, in particular in a conical transition region 15 of the first chamber portion 3 to the second chamber portion 4.

In the exemplary embodiments, four first flattened portions 13 are evenly distributed around the circumference of the first chamber portion 3 and form a square cone. As viewed in a cross-section normal to the cylinder axis 1a and the prechamber vertical axis 2a, the first flattened portions 13 are arranged, for example, in the form of a rhombus. The first chamber portion thus has a rhombus-like cross-section in the region of the first flattened portions 13, as shown in FIG. 2.

Figure 2:
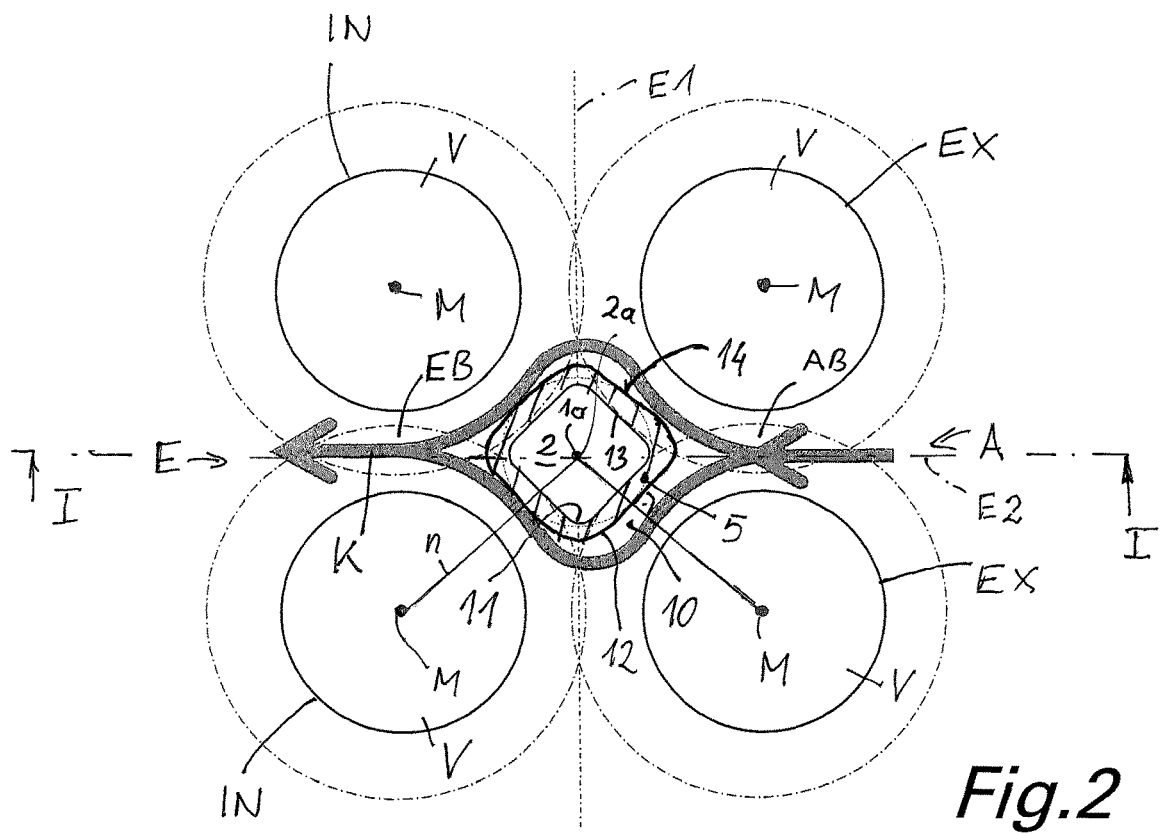
FIG. 2 the cylinder head in a section according to line II-II in FIG. 1.

As can be seen in FIG. 2, analogous to the first flattened portions 13, the second flattened portions 14 can also be arranged in the form of a rhombus. In this way, the distance between the prechamber 2 and the cooling jacket 10 can be reduced or minimized. This makes it possible to minimize heat transfer losses and maximize heat transfer into the cooling liquid. Thus, prechamber 2 and, in particular, ignition device 16 can be cooled as needed. The resulting compact prechamber design further enables an optimized design of gas exchange channels—intake channels IN and exhaust channels EX—and seat ring sizes.

In addition to the flat shape shown in FIG. 2, the first flattened portions and/or second flattened portions can also form a convex or concave shape. FIG. 3 shows various possible rhombic arrangements for first flattened portions 13 or second flattened portions 14. For example, FIG. 3a shows a convex arrangement of first flattened portions 13, while FIG. 3d shows a concave arrangement of first flattened portions 13. FIG. 3b and FIG. 3c show planar embodiments of rhombic first flattened portions 13, while FIG. 3c shows a square arrangement of first flattened portions 13. FIG. 3d shows a general rhombus with planar first flattened portions 13.

FIG. 2 also shows schematically the coolant flow K through the cooling jacket 10, which here takes place from the outlet side A to the intake side E of the cylinder head 1. Coming from the outlet side A of the cylinder head 1, the coolant flows in the direction of the cylinder center, i.e. the cylinder axis 1a, in the area of an exhaust valve bridge AB between two exhaust channels EX, flows around the prechamber 2 along the second flattened portions 14 of the outer wall surface 12 of the prechamber 2 and flows further in the area of an intake valve bridge EB between two intake channels IN to the intake side of the cylinder head 1.

The first 13 and/or second flattened portions 14 are arranged in a region between the prechamber vertical axis 2a and at least one gas exchange channel, i.e. an intake channel IN and/or exhaust channel EX.

As seen in plan view, at least one surface normal n of at least one first 13 and/or second flattened portion 14 is guided through a valve center M of a nearest gas exchange valve V of an intake channel IN or exhaust channel EX and intersects the prechamber vertical axis 2a.

At least a first flattened portion 13 is arranged in a region of the inner wall surface 11 which has the smallest distance to an adjacent gas exchange channel, i.e. intake channel IN or exhaust channel EX.

Furthermore, at least a second flattened portion 14 is arranged in a region of the outer wall surface 12 which has the smallest distance to an adjacent gas exchange channel, i.e. intake channel IN or exhaust channel EX.

The first flattened portions 13 and/or second flattened portions 14 are symmetrical to a first vertical plane E1 containing the prechamber vertical axis 2a and to a second vertical plane E2 containing the prechamber axis 2a and normal to the first vertical plane E1. The vertical planes E1 extend between the gas exchange valves V of the internal combustion engine.

As shown in FIG. 4, the prechamber cover surface 20 can also be formed by a separate cover element 17 which accommodates the ignition device 16. The sealing surface 18 between the separate cover element 17 and the prechamber wall 5 can be of conical or crowned design.

FIG. 5 shows a flow profile of the flow S of the fuel/air mixture in the prechamber 2 during a compression stroke of the internal combustion engine. Coming from the combustion chamber 8, the fuel/air mixture flows through the overflow channels 7 and reaches the first chamber portion 3 of the prechamber 2 via the second chamber portion 4, passing the first flattened portions 13 without inducing turbulence or a swirl. Rotational movements about the prechamber vertical axis 2a are therefore avoided. The fuel/air mixture reaches the prechamber cover surface 20 essentially without swirl and is ignited here by the ignition device 16.

The invention claimed is:

1. A cylinder head for an internal combustion engine, having a prechamber which is arranged in the cylinder head and is defined by an inner wall surface of a prechamber wall, wherein the prechamber comprises a first chamber portion and a second chamber portion, wherein the first chamber portion has a greater maximum diameter (D) than the second chamber portion, wherein at least one ignition device opens into the first chamber portion, and the second chamber portion comprises at least one overflow channel for the passage of flow into a combustion chamber which adjoins a fire deck, wherein at least one inner wall surface of the first chamber portion comprises at least one first flattened portion, wherein a plurality of flattened portions selected from the group consisting of first and second flattened portions are arranged distributed around the circumference of the first chamber portion, and wherein the flattened portions selected from the group consisting of the first and second flattened portions are arranged uniformly distributed around the circumference of the first chamber portion.

2. The cylinder head according to claim 1, wherein the at least one first flattened portion is arranged in a transition region to the second chamber portion.

3. The cylinder head according to claim 1, wherein the prechamber—at least in the region of the first flattened portion—is surrounded by a cooling jacket, wherein the prechamber wall separates the cooling jacket from the prechamber, and wherein at least one outer wall surface of the prechamber wall includes in the region of the at least one first flattened portion a second flattened portion on the cooling jacket side.

4. The cylinder head according to claim 1, wherein the first chamber portion has a substantially rhombus-shaped cross-section in the region of the at least one first flattened portion.

5. The cylinder head according to claim 1, wherein each of the at least one first flattened portion is associated with a second flattened portion.

6. The cylinder head according to claim 1, wherein the flattened portions selected from the group consisting of the first flattened portions and second flattened portions—as viewed from a perspective selected from the group consisting of in cross-section normal to a cylinder axis and a prechamber vertical axis of the prechamber—are arranged essentially in the form of a rhombus.

7. The cylinder head according to claim 1, wherein the flattened portions selected from the group consisting of the first and second flattened portions are substantially in the form of a square cone.

8. The cylinder head according to claim 1, wherein the flattened portions selected from the group consisting of the first and second flattened portion is of a flat, convex or concave design.

9. The cylinder head according to claim 1, wherein the flattened portions selected from the group consisting of the first and second flattened portion is arranged in a region between a prechamber vertical axis and at least one intake channel (IN) or exhaust channel (EX).

10. The cylinder head according to claim 1, wherein—as viewed in plan view—at least one surface normal (n) of the flattened portions selected from the group consisting of the first and second flattened portion is guided through a valve center (M) of a nearest gas exchange valve (V).

11. The cylinder head according to claim 1, wherein at least the first flattened portion is arranged in a region of the inner wall surface which has the smallest distance to an adjacent intake channel (IN) or exhaust channel (EX).

12. The cylinder head according to claim 11, wherein at least a second flattened portion is arranged in a region of the outer wall surface which has the smallest distance to an adjacent intake channel (IN) or exhaust channel (EX).

13. The cylinder head according to claim 1, wherein flattened portions selected from the group consisting of two first flattened portions and two second flattened portions are formed symmetrically with respect to at least one vertical plane (E1, E2) containing the prechamber vertical axis (2a).

14. The cylinder head according to claim 1, wherein flattened portions selected from the group consisting of the first flattened portions and second flattened portions are formed symmetrically with respect to a first vertical plane (E1) containing the prechamber vertical axis (2a) and with respect to a second vertical plane (E2) containing the prechamber vertical axis (2a) and standing normal to the first vertical plane (E1), wherein the vertical planes (E1, E2) extend between the gas exchange valves (V) of the internal combustion engine.

15. The cylinder head according to claim 1, wherein the prechamber is at least partially integrated into the cylinder head.

16. The cylinder head according to claim 1 wherein the prechamber is closed off by a separate cover element accommodating the ignition device, wherein a conical or crowned sealing surface is formed between the cover element and the prechamber wall.

17. The cylinder head according to claim 1, wherein at least one component selected from the group consisting of the cylinder head and the prechamber are manufactured in an additive manufacturing process.

18. The cylinder head according to claim 1, wherein at least one overflow channel is drilled.

19. The cylinder head according to claim 15, wherein the prechamber is fully integrated into the cylinder head.

* * * * *